Feb. 4, 1969
NG CHUE MENG
3,425,214
WRIST BAND WITH ADJUSTABLE LINKAGE
Filed Oct. 11, 1966
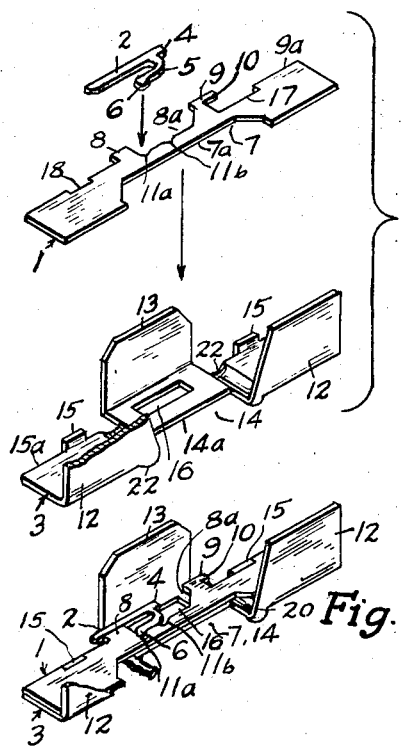
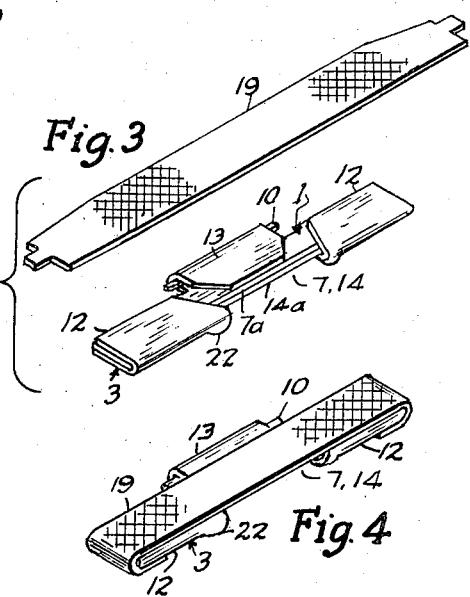
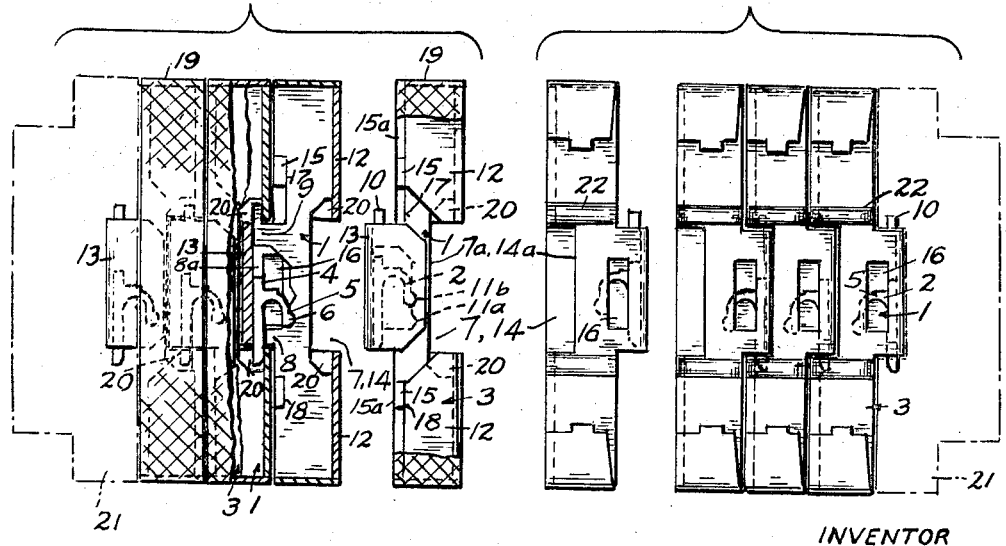
INVENTOR
*Ng Chue Meng*
BY
*Harry Jacobsen*
ATTORNEY United States Patent Office 3,425,214
Patented Feb. 4, 1969

3,425,214
WRIST BAND WITH ADJUSTABLE LINKAGE
Ng Chue Meng, Kowloon, Hong Kong, assignor to Stelux Manufacturing Co., Ltd., Kowloon, Hong Kong, a corporation of Hong Kong
Filed Oct. 11, 1966, Ser. No. 585,822
U.S. Cl. 59—80                9 Claims
Int. Cl. B21l 11/00; F16g 15/14

ABSTRACT OF THE DISCLOSURE

A wrist band comprising links having a casing and a locking member with a terminal part projectable to a position beyond the casing to lock with a portion of a similar adjacent link. The casing has a slot to expose part of the locking member for manipulation thereof. Retaining means are provided so that the locking member can be maintained either in a locked or unlocked position.

---

This invention relates to wrist bands for watches and the like, and is concerned with wrist bands made of interconnected metal or the like links.

The invention is directed to a wrist band formed of interconnected links wherein selected adjacent links are detachably interengageable at any selected one or more points, so that at such points, adjacent links may be separated, changes made and links rejoined as desired, without the need for other processing than the sliding of an easily accesib!e and manipulated locking member in the proper direction.

The invention is intended to provide a wrist band in which a typical link incorporates not only articulating means for detachably and hingedly attaching the link to a similar or identical link, but also supplies means for detachably receiving and holding in operative position, the detachable attaching means of an adjacent identical or similar link. Such means makes it possible to add or remove, without damage or change therein, one or more of such links thereby to adjust the effective length of the band as required to fit any individual's wrist, or to remove and replace with a new link, any link which has become damaged or is defective.

All, or a substantial proportion, of the links in the band may each be detachably engaged with the next link of the band. A link which detachably engages an adjacent link is formed with relatively movable parts, e.g., a body portion fitted with a readily accessible slidable locking pin portion. Relative movement of the parts in one sense facilitates the fitting together of the link with an adjacent link, and subsequent relative movement in the opposite sense ensures adequate connection of the two links.

The invention will be clearly understood from the following description of one form, given however, merely by way of example, which it assumes, and this description will be more readily followed by reference to the accompanying drawings, wherein FIG. 1 is an exploded perspective view of the three component elements from which the body of the wrist band link is made in accordance with the invention.

FIG. 2 is a perspective view, partly broken away, of the elements of FIG. 1 when in the assembled but unsecured positions thereof.

FIG. 3 is a perspective view of the body shown in FIG. 2 after the elements have been assembled and secured, in association with a decorative cladding strip to be affixed thereto.

FIG. 4 is a perspective view of the link showing the cladding of FIG. 3 affixed thereto.

FIG. 5 is an enlarged fragmentary view of a wrist band partly broken away and partly in vertical section, illustrating a plurality of detachable links such as shown in FIGS. 1–4, some of the links being connected together as part of the band and another about to be connected to the band.

FIG. 6 is a back view of the fragmentary band of FIG. 5.

In carrying the invention into effect in one convenient manner, as shown in the aforesaid drawings, a typical detachable and reconnectable link of the band comprises an inner flat body plate 1, a slidable, substantially J-shaped locking member 2 serving both as a hinge pintle and locking bolt, and an outer guide member, holder and casing 3. The locking member 2 is an important feature of the invention. It comprises a substantially straight arm or pin 4 having near one end, an outstanding hook-like projection 5 coplanar with the remainder of the member, the tip 6 of the projection being somewhat bulbous. The body plate 1 is of generally rectangular strip or sheet form with a recess 7 formed in one side for the reception of certain parts projecting from the opposite side 9a of a similar plate of an adjacent link. From said opposite side 9a, a short projection 8 extends and serves as a guide wall for engaging the locking member 2 and guiding said member during its locking and releasing movements.

A second larger L-shaped projection 9 in spaced relation to the projection 8 also extends from the side 9a. One leg 10 of said projection operates as a relatively fixed pivot pin cooperating with the movable pin 4 to secure adjacent links detachable together. The other leg of the projection 9 acts as a stop limiting the sliding movement of the locking member 2 in an unlocking direction. The edge of the recess 8a formed between the projections 8 and 9 is provided with two spaced apart dimples 11a and 11b to receive the bulbous tip 6 of the hook 5 and to resist movement of the locking member 2 out of either of the two positions determined by the dimples.

The casing 3 is also preferably of a sheet or strip material very slightly wider than the strip plate 1, and has on one side spaced apart upstanding fastening lugs or flaps 12 and on the opposite side a third similar lug or flap 13 located between the lugs 12. The width of each lug is about a third of the length of the casing 3 and is adapted to be folded on to the plate 1 and member 2 to hold the parts permanently together. The edge 14a of the casing 3 between the lugs 12 is recessed as at 14. It is intended that the edge 14a of the recess 14 register with the longer edge 7a of the recess 7 in the plate 1 when the plate is assembled with the casing. The difference in the lengths of the recesses 7 and 14 provides sockets for the hinging pins as will be later more fully described. The combined recesses 7 and 14 provide a space for the reception of projecting parts as 13, 10 and 4 of an adjacent link for locking purposes as will soon be apparent. The opposite edge 15a of the casing 3 being opposite the recess 14, has an upstanding locating prong 15 in front of each lug 12. A slot 16 is formed in the casing 3 between the recess 14 and the lug, through which slot access may readily be had to the hook 5 of the locking member 2.

The component elements shown in FIG. 1 are assembled by locating the hook 5 in the recess 8a in contact with the edge of the recess and coplanar with the plate 1. The bulbous tip 6 is seated in one of the dimples 11a or 11b. The plate 1 and locking member 2 are laid on the casing between the lugs 13 and 12, the edges 7a and 14a being brought into registration with each other. The respective end edges of the plate and casing are also caused to register by means of a step 17 and a slot 18 in the edge of the plate 1, which engage the prongs 15 of the casing to locate and hold the plate and casing aligned. The projection 8 being shorter than the projection 9, a slight gap or space (FIGS. 2 and 5) between the tip of the projection 8 and the lug 13 adjacent the recess 8a, accommodates the arm or pin 4 of the locking member, which is held slidably by the lug 13 in said space.

The various elements when fitted together as described, are in the positions shown in FIG. 2. From those positions, the lugs 12 and 13 are then folded down on to the plate and locking member and retain them in their thus assembled relationship, as best seen in the lower part of FIG. 3. Care is taken when folding down the lug 13 to leave sufficient play for the locking member 2 to slide in the direction parallel to the arm 4 and within the limits allowed, between the projections 8 and 9. Access to the locking member is still possible, when the lug 13 is folded down, through the slot 16 of the casing whereby the locking member 2 may be moved by means of a suitable pointed tool inserted into the slot and engaging the cross portion of the J-hook 5. Engagement of the bulbous end 6 in a selected one of the dimples 11a or 11b defines an advanced and a retracted position, into which positions the locking member can slide. In the advanced position, the tip of the arm 4 of the locking member extends beyond the lug 13 and projection 8 to lock the assembled link in place to the adjacent link. In the retracted position, the link is released for withdrawal from the adjacent link.

For decorative purposes a cladding strip 19, with an etched, milled or other surface pattern, is located on top of the link assembly (FIG. 3) and the ends folded over the ends of the assembly. Said strip 19 masks the recesses 7 and 14 but is of substantially the same width as the plate 1 and casing 3, so that the folded lug 13 and the fixed and slidable hinging pin elements 10 and 4 project beyond the other edge of the cladding strip 19 (FIG. 4).

The mode of interconnection of a plurality of links such as described above, to form a wrist band, is shown in FIGS. 4 and 5. By virtue of the folding over of the lugs 12 and 5 overlapping the ends of the recess 7 of the plate 1 and the difference in lengths of the recesses 7 and 14, there is formed at each end of the recess 14 of a link a pin bearing or recess 20 closed by the lugs 12 on one face and one side and by the plate 1 on the opposite face, an end and the other side. By manipulation of a pin or the like tool in the slot 16 of a link the locking member is moved to draw the end of the arm 4 inside the folded lug 13 into the position of the locking member shown by the right hand link of FIG. 5. It now becomes possible to fit the relatively fixed pin 10 of this link into the bearing 20 therefor in an adjacent link and to ease the folded lug 13 into the recess 14 of the adjacent link. The locking member is then caused to slide into its advanced position to project the end of the arm 4 into the bearing 20 aligned therewith. The links are then held in articulated connection by the pin 10 and arm 4 of one link engaging in the bearings 20 of its neighbor. The locking member 2 is held against inadvertent retraction of the bulbous end 6 seated in the outer dimple 11a. Parts 22 of the casing including the bearings 20 are preferably buldged out beyond the adjacent part of the casing to space the casing and the major part of the band away from the wrist of the wearer.

From the above description, it will be seen that the invention provides a simple and effective adjustable wrist bank link, and a wrist band made from such links, but it should be understood that the invention is not limited solely to the specific details of the form described above, which may be modified to meet various conditions and requirements encountered without departing from the spirit of the invention.

I claim:

1. A link for a linked wrist band comprising a casing and a locking member having a terminal part projectable beyond the casing and retractable within the casing for respectively locking said link, and unlocking said link from, a similar adjacent link, the locking member being longitudinally rigid, bodily slidable and of J-shape, and retaining means for automatically maintaining the locking member in the retracted unlocking position thereof.

2. A link for a linked wrist band comprising a casing and a locking member normally partly enclosed by the casing and retractible within the casing for unlocking said link from an adjacent link of the band, the casing having a slot therein in a position to expose part of the locking member for manipulation thereof, said link having an extension along a portion of one side edge thereof wherein the locking member is slidable, an interior plate carrying a fixed pin extending beyond the extension, the locking member having a terminal pin axially aligned with the fixed pin, the casing and the plate having registering recesses arranged at the opposite side edge of the link adapted to receive an extension similar to the aforesaid extension, of a similar link arranged adjacent to the first mentioned link.

3. The link of claim 2, the locking member being J-shaped, and cooperating means on the plate and a leg of the locking member for resisting movement of the locking member out of the locking and retracted positions thereof.

4. The link of claim 2, the casing enclosing the plate and carrying the extension and cooperating with the plate to provide bearings for the fixed and terminal pins.

5. The link of claim 2, the casing having a middle lug on one edge folded on to the plate and the locking member and forming the extension and having spaced apart edge lugs on the opposite edge folded on to the plate, the recess in the plate extending beyond both ends of the recess in the casing and providing bearing spaces between the face of the casing and said spaced apart folded edge lugs for the reception of the terminal pin of said similar link when the extension of said similar link is arranged in the recesses.

6. A wrist band having a multiplicity of interconnected links, selected links being according to claim 1.

7. A wrist band having links according to claim 2 wherein selected links are separable from adjacent links thereby permitting the insertion and attachment of additional similar links between the separated links, the selected links being also completely removable from the band to permit replacement thereof and to permit reconnection of the links on proper movement of the locking members thereof.

8. The wrist band of claim 7, the interconnected links being adapted for hinging movement relatively to each other whereby the band is bendable about the wrist of a wearer.

9. The link of claim 1, the retaining means comprising a bulbous terminal on said locking member and a plate within the casing having an edge dimple adapted to receive said terminal thereby to lock said member in a selected position on the movement of said member into said position and to unlock said member on the movement of said member manually out of said position.

References Cited

UNITED STATES PATENTS

| | | | |
|---|---|---|---|
| 2,998,697 | 9/1961 | Augenstein | 59—80 |
| 3,195,301 | 7/1965 | Bello | 59—80 |

FOREIGN PATENTS

| | | |
|---|---|---|
| 1,128,696 | 4/1962 | Germany. |

CHARLES W. LANHAM, *Primary Examiner.*

G. P. CROSBY, *Assistant Examiner.*

U.S. Cl. X.R.

59—91, 82